(12) United States Patent
Umemoto et al.

(10) Patent No.: US 6,891,530 B2
(45) Date of Patent: May 10, 2005

(54) TOUCH PANEL-INCLUDING ILLUMINATOR AND REFLECTIVE LIQUID-CRYSTAL DISPLAY DEVICE

(75) Inventors: Seiji Umemoto, Ibaraki (JP); Ryoji Kinoshita, Ibaraki (JP); Yuuki Nakano, Ibaraki (JP); Hiroaki Kishioka, Ibaraki (JP); Waka Sakaitani, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 361 days.

(21) Appl. No.: 10/121,704

(22) Filed: Apr. 15, 2002

(65) Prior Publication Data

US 2002/0180711 A1 Dec. 5, 2002

(30) Foreign Application Priority Data

Apr. 16, 2001 (JP) ...................... P2001-116430

(51) Int. Cl.[7] ........................... G09G 5/00; G02F 1/1335
(52) U.S. Cl. ........................... 345/173; 345/87; 362/31; 359/599; 349/61
(58) Field of Search ................................ 345/173–178, 345/87–104, 61–66; 362/31, 551, 558; 359/528, 599

(56) References Cited

U.S. PATENT DOCUMENTS

| | | | | |
|---|---|---|---|---|
| 6,123,431 A | * | 9/2000 | Teragaki et al. ............... | 362/31 |
| 6,379,017 B2 | * | 4/2002 | Nakabayashi et al. ......... | 362/31 |
| 6,512,561 B1 | * | 1/2003 | Terashita et al. ............ | 349/118 |
| 6,529,188 B1 | * | 3/2003 | Suzuki ....................... | 345/173 |
| 6,559,834 B1 | * | 5/2003 | Murakami et al. .......... | 345/173 |
| 6,559,902 B1 | * | 5/2003 | Kusuda et al. ................ | 349/12 |
| 6,636,283 B2 | * | 10/2003 | Sasagawa et al. ............ | 349/65 |
| 6,738,051 B2 | * | 5/2004 | Boyd et al. .................. | 345/176 |
| 6,747,801 B2 | * | 6/2004 | Umemoto et al. .......... | 359/599 |
| 2001/0002153 A1 | * | 5/2001 | Yano ......................... | 359/599 |
| 2002/0080597 A1 | * | 6/2002 | Coghlan ...................... | 362/31 |

FOREIGN PATENT DOCUMENTS

| | | |
|---|---|---|
| JP | 2000-162594 | 6/2000 |
| TW | 422346 | 2/2001 |

OTHER PUBLICATIONS

Japanese Abstract No. 2000075293, dated Mar. 14, 2000.
Japanese Abstract No. 2000187197, dated Jul. 4, 2000.

* cited by examiner

*Primary Examiner*—Alexander Eisen
*Assistant Examiner*—Robin Mak
(74) *Attorney, Agent, or Firm*—Sughrue Mion, PLLC

(57) ABSTRACT

A touch panel-including illuminator having: a light pipe made of a transparent plate-like material having an upper surface, a lower surface and at least one incidence side surface, the upper surface being provided with light output means through which light incident on the incidence side surface is made to emerge from the lower surface; a light source disposed on the incidence side surface of the light pipe; an adhesive layer; and a touch panel bonded to the upper surface of the light pipe through the adhesive layer; wherein the light output means are constituted by fine grooves which are disposed discontinuously, each of which is made of a concave portion, and each of which is shaped like an approximate triangle in section; and wherein each of the fine grooves has an optical path changing slope and a steep slope.

18 Claims, 4 Drawing Sheets

TOUCH PANEL-INCLUDING ILLUMINATOR AND REFLECTIVE LIQUID-CRYSTAL DISPLAY DEVICE

The present application is based on Japanese Patent Application No. 2001-116430, which is incorporated herein by reference.

BACKGROUND OF THE INVENTION

1. Field of the Invention

The present invention relates to a front light type touch panel-including illuminator which can be used for forming a touch-input type reflective liquid-crystal display device displaying an image hardly disordered, free from moire, bright and easy to view.

2. Description of the Related Art

As a related-art reflective liquid-crystal display device having a reflective liquid-crystal display panel, an illuminator constituted by a side light type light pipe, and an input position detecting touch panel provided on a visual side of the reflective liquid-crystal display panel through the illuminator, there is known a reflective liquid-crystal display device having a touch panel-including illuminator formed by integrating a touch panel with a side light type light pipe, the touch panel including a pressure-receiving side base material formed to have light-diffusing type light output means by mixing diffusing particles or printing a diffusing material (Unexamined Japanese Patent Publication No. 2000-162594).

Such a front light type reflective liquid-crystal display device having the illuminator disposed on the visual side is used in a mobile apparatus such as a cellular phone or a portable personal computer. According to the reflective liquid-crystal display device, emergent light of the light incident on a side surface of the light pipe is reversed in traveling course by a reflecting layer so that display light based on the reversed emergent light is viewed through the light pipe and the touch panel. Accordingly, a total reflective reflecting layer can be used and reflectance can be made high. Hence, the front light type reflective liquid-crystal display device has an advantage in that a display image can be made bright compared with a semi-transmissive liquid-crystal display device using a backlight unit and a half mirror.

In the reflective liquid-crystal display device, however, the touch panel and the side light type light pipe are integrally bonded to each other through a tacky layer, so that a gap between the touch panel and the side light type light pipe is filled with the tacky layer. For this reason, interfacial reflection in a surface of the light pipe or in a lower surface of the touch panel hardly occurs. Hence, lowering of display contrast is small but the light-diffusing type light output means hardly make light emerge in a direction perpendicular to the liquid-crystal display panel. Accordingly, there is basically a problem that effective light-utilizing efficiency is substantially considerably poor and luminance in a viewing direction is low.

There is a problem that the touch panel (particularly transparent electrodes of the touch panel) breaks down easily to shorten the lifetime of the touch panel. There is another problem that a display image obtained by the reflective liquid-crystal display device is disordered by light-diffusing dots to thereby result in reduction of resolution due to the image blurred. It is conceived that the former problem of easy breaking down is caused by the fact that the transparent electrodes are damaged and degraded easily by a concavo-convex structure of the light-diffusing type light pipe given to the pressure-receiving side base material when the transparent electrodes disposed to face each other through the input side and pressure-receiving side base materials are pressed to be brought into contact with each other so that position detection is performed by electrical current conduction between the transparent electrodes.

On the other hand, as the light output means, there are known portions formed into a prism structure of prism-like concavo-convex portions arranged like stripes at equal intervals, and portions constituted by convex or concave portions arranged like pits and each shaped like a cylinder in section. In the light output means in such a prism structure, bright display can be expected due to improvement of effective light-utilizing efficiency, but stress is concentrated on apices of the prisms to corrupt the prism structure at the time of inputting because the transparent electrodes also have prism-like concavo-convex portions. Hence, there is a disadvantage in that cracking or peeling of the transparent electrodes is apt to occur to thereby make the lifetime of the touch panel shorter.

In the front light system, the touch panel-including illuminator needs to have the following characteristics in terms of the visibility. That is, light can be made to emerge from the lower surface efficiently with good perpendicular directivity to thereby obtain excellent luminance; light leaked from the upper surface to disturb the visibility of a display image is weak; the display image is not disordered; external light can be transmitted efficiently; and the presence of the light pipe is not observed conspicuously. The light output means in the prism structure have a problem that the prism structure is apt to become conspicuous to disturb the visibility of the display image. The light output means in the prism structure have also a problem that the prism structure interferes with pixels of the liquid-crystal display panel to cause moire to thereby reduce display quality greatly.

As a countermeasure against moire, there has been proposed a method in which the direction of arrange of prisms is inclined to the direction of arrangement of pixels to thereby suppress moire. In the countermeasure, however, the moire-preventing effect is poor if the inclination angle is low. On the other hand, if the angle is high, light transmitted through the light pipe is reflected laterally by the prism surfaces. As a result, the countermeasure has a disadvantage in that the angle of emergence of light is inclined so largely that both the illumination efficiency and the light output efficiency are lowered.

On the other hand, in the light output means constituted by convex or concave portions arranged like pits and each shaped like a cylinder in section, light emerges at an angle largely inclined to the direction normal to the lower surface of the light pipe by light diffusion at the time of reflection in the same manner as the light-diffusing dots. Hence, the emergent light is poor in perpendicular directivity and not effective in illuminating the reflective liquid-crystal display device. That is, the reflecting surface of the reflective liquid-crystal display device generally takes a normal distribution type reflection form. Hence, reflectance increases as the direction of reflection approaches the direction of regular reflection. For this reason, if light emerging from the lower surface of the light pipe is poor in perpendicular directivity, light reflected by the reflecting surface can hardly illuminate the liquid-crystal display device effectively even in the case where emission efficiency on the lower surface is excellent. As a result, there is little contribution to improvement in luminance of the liquid-crystal display device, so that display is dark in the frontal direction. The direction of viewing the liquid-crystal display device made by the observer is generally equal to the direction normal to the liquid-crystal display device, that is, to the direction normal to the lower surface of the light pipe. Hence, light emerging in the direction normal to the lower surface of the light pipe illuminates the liquid-crystal display device most effectively.

In the light output means in the pit structure, portions having an inclination angle near to flat portions are formed continuously in the same manner as in semi-spherical dots. In reflection of external light, the light reflected by the portions having an inclination angle near to the flat portions reaches the observer's eyes continuously on the heels of the flat portions, so that the pits are apt to become conspicuous. There is a further disadvantage in that the presence of the light output means is apt to be recognized.

SUMMARY OF THE INVENTION

An object of the invention is to develop a front light type touch panel-including illuminator which can be used in an excellent lifetime for forming a reflective liquid-crystal display device, so that, in the display device formed thus, the presence of a light pipe is not observed conspicuously, moiré hardly occurs, light incident on a side surface is made to emerge from a lower surface efficiently with good perpendicular directivity, display is bright and a display image is hardly disordered.

According to the invention, there is provided a touch panel-including illuminator having: a light pipe made of a transparent plate-like material having an upper surface, a lower surface and at least one incidence side surface, the upper surface being provided with light output means through which light incident on the incidence side surface is made to emerge from the lower surface; a light source disposed on the incidence side surface of the light pipe; a transparent adhesive layer; and a transparent touch panel including an input position detecting mechanism and bonded to an outer side of the upper surface of the light pipe through the transparent adhesive layer; wherein the light output means are constituted by fine grooves which are disposed discontinuously, each of which is made of a concave portion having a length of not larger than 250 μm and a depth of not larger than 50 μm and not larger than ⅕ as large as the length, and each of which is shaped like an approximate triangle in section; wherein each of the fine grooves has an optical path changing slope inclined at an angle ranging from 35 to 48 degrees to the lower surface of the light pipe, and a steep slope inclined at an angle of not lower than 60 degrees to the lower surface of the light pipe so as to face the optical path changing slope; and wherein the fine grooves are disposed so that the optical path changing slopes face the light source so as to be able to receive light incident on the incidence side surface of the light pipe from the light source. There is also provided a reflective liquid-crystal display device having a touch panel-including illuminator defined above, and a reflective liquid-crystal display panel disposed on the lower surface side of the light pipe in the touch panel-including illuminator.

According to the invention, there can be obtained a light pipe in which light incident on an incidence side surface can be made to emerge from a lower surface through optical path changing slopes efficiently with good perpendicular directivity. The light pipe can be used for obtaining a touch panel-including illuminator excellent both in light-utilizing efficiency and in frontal luminance. There can be also obtained a front light type touch panel-including illuminator which can be used for forming a reflective liquid-crystal display device so that, in the liquid-crystal display device formed thus, moire is prevented from being caused by interference between pixels and light output means constituted by fine grooves arranged discontinuously, the presence of the light output means is not observed conspicuously, and light leakage from the upper surface of the light pipe is so little that bright display can be obtained. In addition, because the light output means are constituted by fine grooves, stress is hardly concentrated on transparent electrodes when the touch panel is touched. Accordingly, the touch panel hardly breaks down, so that the touch panel is excellent in lifetime. Moreover, the light output means prevent a display image on the reflective liquid-crystal display from being disordered. Accordingly, the reflective liquid-crystal display device is excellent in resolution.

DETAILED DESCRIPTION OF THE PREFERRED EMBODIMENTS

According to the invention, there is provided a touch panel-including illuminator having: a light pipe made of a transparent plate-like material having an upper surface, a lower surface and at least one incidence side surface, the upper surface being provided with light output means through which light incident on the incidence side surface is made to emerge from the lower surface; a light source disposed on the incidence side surface of the light pipe; a transparent adhesive layer; and a transparent touch panel including an input position detecting mechanism and bonded to an outer side of the upper surface of the light pipe through the transparent adhesive layer; wherein the light output means are constituted by fine grooves which are disposed discontinuously, each of which is made of a concave portion having a length of not larger than 250 μm and a depth of not larger than 50 μm and not larger than ⅕ as large as the length, and each of which is shaped like an approximate triangle in section; wherein each of the fine grooves has an optical path changing slope inclined at an angle ranging from 35 to 48 degrees to the lower surface of the light pipe, and a steep slope inclined at an angle of not lower than 60 degrees to the lower surface of the light pipe so as to face the optical path changing slope; and wherein the fine grooves are disposed so that the optical path changing slopes face the light source so as to be able to receive light incident on the incidence side surface of the light pipe from the light source.

Figure 1:
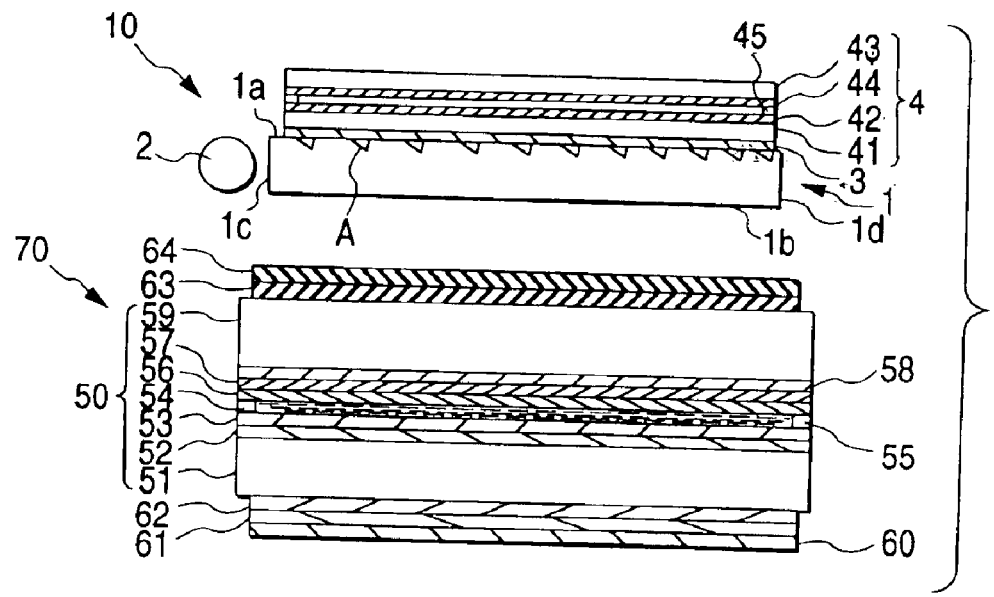
FIG. 1 is a side view for explaining a touch panel-including illuminator and a reflective liquid-crystal display device.

FIG. 1 shows an example of the touch panel-including illuminator. In FIG. 1, the touch panel-including illuminator 10 has a light pipe 1 made of a transparent plate-like material, a light source 2, a transparent adhesive layer 3, and a transparent touch panel 4. Incidentally, FIG. 1 shows the case where the touch panel-including illuminator 10 is applied to a reflective liquid-crystal display device having a reflective liquid-crystal display panel 70.

Figure 2:
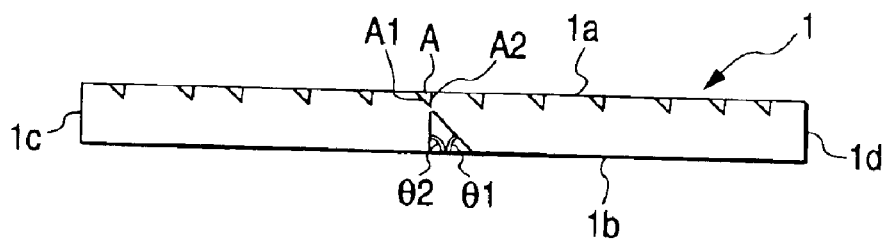
FIG. 2 is a side view for explaining a light pipe.
Figure 3:
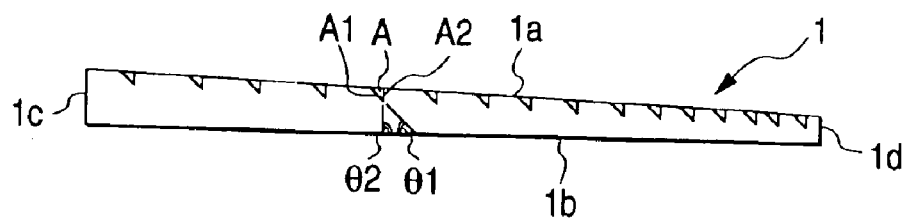
FIG. 3 is a side view for explaining another light pipe.

As shown in FIG. 2 or 3, any light pipe made of a transparent plate-like material maybe used if the light pipe has: an upper surface 1a provided with light output means A and facing the observer's side; a lower surface 1b serving as a light emergence surface opposite to the upper surface 1a; an incidence side surface 1c which is one of side surfaces between the upper and lower surfaces 1a and 1b and on which a light source 2 is disposed so that light from the light source 2 is made incident on the incidence side surface 1c; an opposite end id opposite to the incidence side surface 1c; and a pair of side end surfaces 1e located at opposite ends of the incidence side surface 1c. Alternatively, two or more side surfaces between the upper and lower surfaces may be provided as incidence side surfaces. The shape of each surface is not particularly limited. Particularly the incidence side surface can be formed into a suitable shape in accordance with characteristic such as the form of a light source. Like the incidence side surface, other side surfaces can be formed into suitable shapes.

It is however preferable that the upper and lower surfaces are substantially provided as flat surfaces from the point of view of facilitating attachment to a touch panel, a liquid-crystal display panel or the like and facilitating production. When the upper and lower surfaces are provided as curved surfaces, it is preferable that the shape of each of the upper and lower surfaces does not change rapidly so that a transmitted image is not disordered. The plate-like material may be a uniform-thickness plate as shown in FIG. 2 or may be shaped like a wedge so that the thickness is tapered from the incidence side surface 1c to the opposite end 1d as shown in FIG. 3. The former is excellent in facilitation of attachment. The latter wedge shape is excellent in light output efficiency because light incident on the incidence side surface can be made efficiently incident on the light output means formed in the upper surface, up to the opposite end. Reduction in thickness of the opposite end is favorable for reduction in weight of the light pipe.

The light output means provided in the upper surface become conspicuous if the fine grooves constituting the light output means are large in size. As a result, a display image is disordered so that display quality of the liquid-crystal display device deteriorates greatly. Moreover, the density of the arranged fine grooves constituting the light output means, that is, the number of the fine grooves per unit area of the upper surface of the light pipe is reduced so that there is a tendency that illumination for pixels becomes uneven. In sparse light emission, respective emission points are apt to be conspicuous, so that visibility of the display image is lowered greatly. Increase in number of fine grooves arranged is effective in preventing this problem. Reduction in size of the fine grooves is advantageous in this case. Particularly when the area of the light output means arranged is limited, this is effective as a method for securing uniformity of light emission.

Figure 4:
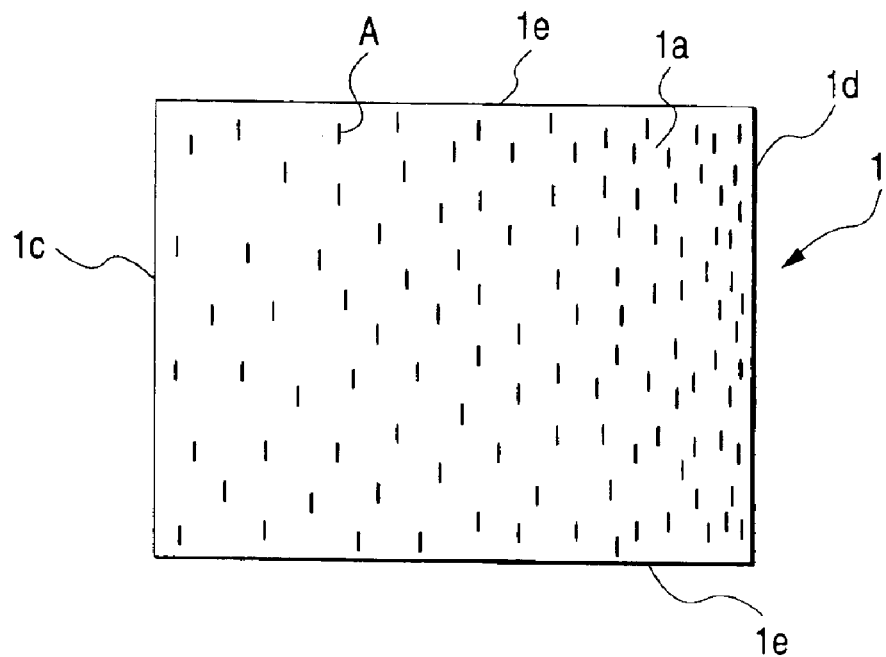
FIG. 4 is a plan view for explaining an example of arrangement of fine grooves.
Figure 5:
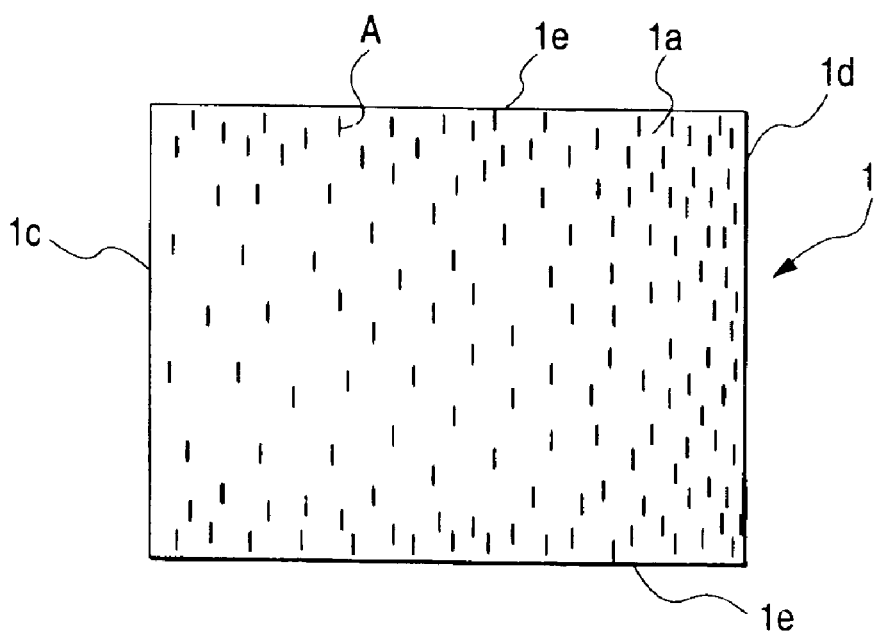
FIG. 5 is a plan view for explaining another example of arrangement of fine grooves.
Figure 6:
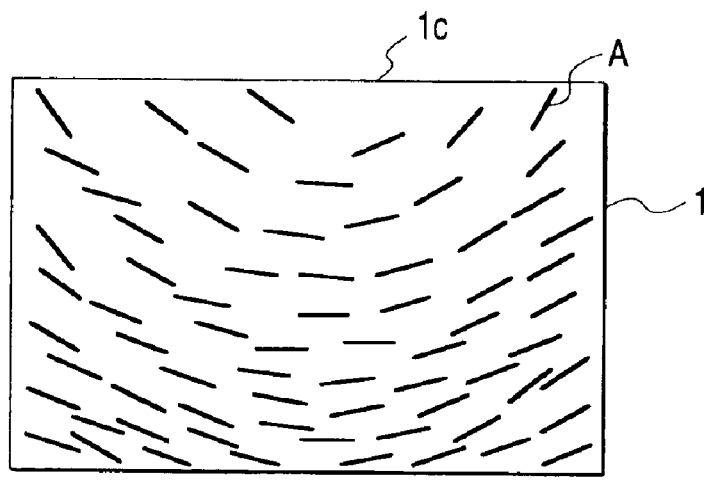
FIG. 6 is a plan view for explaining a further example of arrangement of fine grooves.

Hence, as shown in FIGS. 4 to 6, in order to make the light output means inconspicuous to the observer to thereby improve quality of the display image on the liquid-crystal display device through the touch panel, the light output means are constituted by fine grooves A arranged discontinuously and each made of a concave portion shaped like an approximate triangle in section. Each of the fine grooves A has a length of not larger than 250 $\mu$m, especially not larger than 150 $\mu$m, further especially not larger than 100 $\mu$m and a depth of not larger than 50 $\mu$m, especially not larger than 20 $\mu$m, further especially not larger than 15 $\mu$m the depth being not larger than ⅕ as large as the length. The term "approximate" in the approximate triangle in section means that changing such as curving of a side, or rounding of an intersection point between sides can be allowed.

The lower limit size of the fine grooves is not particularly limited. If the fine grooves are too fine, a phenomenon of diffraction of light is dominated so that reflection or total reflection hardly occurs. Moreover, the number of the light output means arranged becomes so excessive that production efficiency is lowered. In addition, when the light pipe is bonded to the touch panel through the adhesive layer, the adhesive layer is apt to enter the fine grooves constituting the light output means to thereby reduce light-utilizing efficiency. From this point of view, it is preferable that each of the fine grooves has a length of not larger than 10 $\mu$m and a depth of not larger than 2 $\mu$m.

When the depth of each of the fine grooves is selected to be not larger than ⅕ as large as the length thereof as described above, transmitted light can be effectively reflected by the optical path changing slopes so that light incident on the side surface can be made to emerge from the lower surface efficiently. If the depth of each of the fine grooves is larger than the length thereof, that is, if the length of each of the fine grooves is shorter than the depth thereof, the probability that transmitted light will be made incident on the optical path changing slopes decreases and the probability that the light will be made incident on the side surfaces of the fine grooves increases. As a result, the ratio of transmitted light scattered increases and light-utilizing efficiency is lowered. From the point of view of the efficiency, it is preferable that the depth of each of the fine grooves is selected to be not larger than ⅛, especially not larger than 1/10 as large as the length thereof. Incidentally, the length of each of the fine grooves is based on the length of each of the long sides of the optical path changing slopes whereas the depth of each of the fine grooves is based on the distance of depression from the upper surface.

On the other hand, discontinuous arrangement of the fine grooves each made of a concave portion shaped like an approximate triangle in section is preferably random as shown in FIGS. 4 to 6, from the point of view of preventing the fine grooves from being observed conspicuously due to regularity produced by the set of fine grooves and preventing moire from being caused by interference between the light output means and pixels. If the fine grooves are arranged regularly, moire may occur in between the regular arrangement of the fine grooves and the regular arrangement of pixels so that visibility of display light on the liquid-crystal display panel is lowered greatly. When the fine grooves are arranged at random to eliminate the regularity of arrangement, moire can be prevented from occurring.

In order to attain uniformity of light emerging from the whole lower surface to thereby illuminate the liquid-crystal display panel evenly and in consideration of attenuation in intensity of transmitted light with the advance of transmission and emergence of light, it is preferable that the fine grooves A are arranged more densely as they are farther from the light source, that is, as they are farther from the incidence side surface 1c. This arrangement can prevent unevenness of intensity of emergent light from being caused by attenuation in intensity of transmitted light with the advance of transmission and emergence of light.

When the quantity of transmitted light on the side end surface side of the incidence side surface is smaller than that on the center of the incidence side surface, it is preferable that the fine grooves A are arranged more densely toward the side end surfaces 1e side based on the incidence side surface 1c as shown in FIG. 5 in order to attain uniformity of light emerging from the whole lower surface to thereby illuminate the liquid-crystal display panel evenly. Incidentally, the intensity of transmitted light in places near to the side end surfaces of the light pipe is often smaller than that in the center of the light pipe due to the length of the light source so that the places near to the side end surfaces may be darker than the center of the light pipe. In this case, the density of the fine grooves arranged increases toward the places near to the side end surfaces of the light pipe so that uniformity of intensity of emergent light can be attained. Incidentally, a method in which the fine grooves are arranged more densely as they are farther from the incidence side surface is also used in FIG. 5.

As shown in FIGS. 2 and 3, each of the fine grooves is formed to have an optical path changing slope A1 inclined at an angle θ1 ranging from 35 to 48 degrees to the lower surface 1b, and a steep slope A2 facing the optical path changing slope A1 and inclined at an angle θ2 of not lower than 60 degrees to the lower surface 1b. Moreover, the fine grooves are arranged so that the optical path changing slopes face the light source so that light incident on the incidence side surface 1c from the light source can be received by the optical path changing slopes. Hence, light incident on the incidence side surface and transmitted through the light pipe can be reflected by the optical path changing slopes A1 so that the reflected light can be made to emerge from the lower surface with good perpendicular directivity.

That is, when, for example, a linear light source such as a cold-cathode tube is disposed on the incidence side surface, the maximum intensity of transmitted light is substantially perpendicular to the incidence side surface. When the optical path changing slopes A1 having the inclination angle are arranged so as to be as perpendicular to the vector of the transmitted light as possible while the optical path changing slopes A1 are made to face the incidence side surface, the transmitted light can be reflected or totally reflected by the optical path changing slopes having the inclination angle so that the reflected light can be made to effectively emerge from the lower surface in a direction near to the normal direction. As a result, light can be made to emerge in a direction effective invisibility, so that light reflected by the reflecting layer of the liquid-crystal display panel and given display information is transmitted through other portions than the light output means in the upper surface of the light pipe to thereby provide display bright and easy to view. From the point of view of the perpendicular directivity, the preferred inclination angle θ1 of the optical path changing slopes is in a range of from 38 to 45 degrees, especially in a range of from 40 to 43 degrees.

As described above, the optical path changing slopes are generally preferably arranged so as to face the light source as accurately as possible and so as to be as perpendicular to the light source as possible so that light incident on the incidence side surface from the light source can be received efficiently by the optical path changing slopes. Hence, when a linear light source is disposed on the incidence side surface, as shown in FIGS. 4 and 5, it is generally preferable that the optical path changing slopes A1 of the fine grooves A are formed to be parallel on the basis of the direction of the length thereof and that the optical path changing slopes A1 are particularly formed to be as parallel to the incidence side surface 1c as possible. There may be however a case where arrangement of the optical path changing slopes obliquely to the incidence side surface in accordance with the light emission characteristic of the light source is preferably excellent in efficiency of incidence on the optical path changing slopes. Therefore, the light output means maybe arranged to be inclined at a suitable angle to the incidence side surface on the basis of the direction of the length thereof.

Incidentally, as shown in FIG. 6, the fine grooves A may be arranged substantially concentrically in the condition that a point light source may be disposed on the incidence side surface for the following purpose. That is, the optical path of light radiated from the point light source and incident on the incidence side surface or the optical path of transmitted light of the incident light is changed by the optical path changing slopes A1 so that light is emitted from the lower surface of the light pipe as evenly as possible, and then light excellent in directivity in the normal direction to the liquid-crystal display panel is made to emerge from the light pipe with good efficiency of utilizing light from the light source. In this case, it is preferable that the fine grooves A are arranged into a substantially concentric form (pit structure) relative to a virtual center while the position where the point light source is disposed on the incidence side surface is regarded as the virtual center. Incidentally, it is preferable that this concentric form is performed so that the virtual center is formed on or outside the incidence side surface of the light pipe in order to facilitate the arrangement of the point light source. A virtual center may be formed, or two or more virtual centers may be formed on one incidence side surface or different incidence side surfaces.

On the other hand, the steep slopes A2 facing the optical path changing slopes A1 are provided as surfaces inclined at an angle θ2 of not smaller than 60 degrees to the lower surface because it is preferable that other surfaces than the optical path changing slopes in the light output means have no influence on visual characteristic, light transmission and light emergence as possible. That is, when the steep slopes A2 are formed to face the optical path changing slopes A1 and to be inclined at an angle θ2 of not smaller than 60 degrees to the lower surface, the projected area of the steep slopes viewed in the direction normal to the light pipe (in the viewing direction of the display panel) can be reduced so that the influence of the steep slopes on visibility of the liquid-crystal display panel disposed on the back can be reduced on the occasion where the light pipe is applied to a front light type touch panel-including illuminator.

In terms of the reflected light of external light by the steep slopes, as the angle of the steep slopes increases, external light reflected by the steep slopes decreases. Accordingly, the reflected light entering the inside of the light pipe and transmitted through the light pipe can have a smaller influence on visibility of display light advantageously. Incidentally, when, for example, the angle of the steep slopes is not higher than about 45 degrees, the reflected light of external light returns to the observer's side to thereby disturb visibility of display light.

When the angle of the steep slopes is selected to be further higher, the apical angle between a slope A1 and a corresponding steep slope A2 forming a fine groove shaped like an approximate triangle in section as shown in FIG. 2 can become so low that returning of the reflected light can be reduced to make the light output means inconspicuous to the observer. The preferred angle θ2 of the steep slopes from the point of view of suppressing the influence of the steep slopes on the visibility is not lower than 75 degrees, especially not lower than 80 degrees. Incidentally, the ideal angle is 90 degrees but, in this case, there is a tendency that the light output means can be hardly formed, for example, by a method of transferring the shape of a mold.

Figure 7:
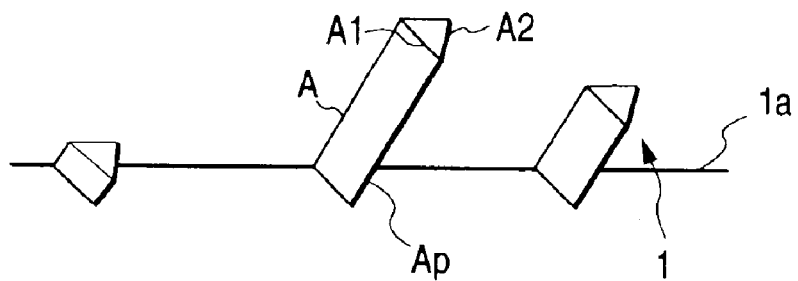
FIG. 7 is a perspective view showing an example of fine grooves.
Figure 8:
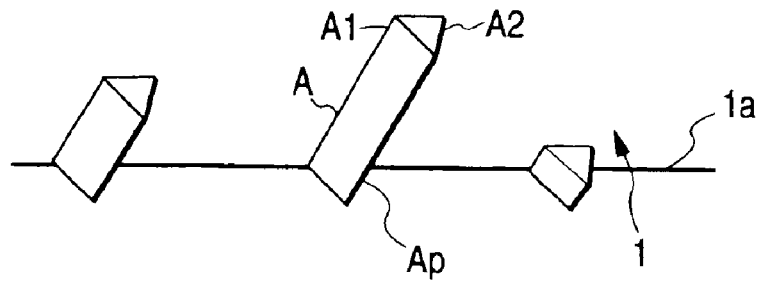
FIG. 8 is a perspective view showing another example of fine grooves.

The optical path changing slopes and the steep slopes may be constituted by straight surfaces as shown in FIG. 7 or may be constituted by curved or bent surfaces in a range satisfying the angle condition as shown in FIG. 8. It is preferable that the apex Ap formed between an optical path changing slope A1 and a corresponding steep slope A2 is as sharp as possible. When the apex is rounded, the radius of the roundness maybe preferably selected to be not larger than 30%, especially not larger than 20%, further especially not larger than 10% as large as the depth of the fine groove. In this case, external light reflected by the roundness can be suppressed to make the fine groove inconspicuous and scattering of light transmitted through the light pipe can be suppressed to improve uniformity of emergent light and light output efficiency.

The shape of each side surface of the fine groove is not particularly limited. From the point of view of suppressing incidence of light on the side surface or reducing the influence thereof, the side surface is preferably provided as a surface inclined at an angle of not lower than 30 degrees, especially not lower than 45 degrees, further especially not lower than 60 degrees relative to the lower surface. From the point of view of optical characteristic such as efficiency of incidence of transmitted light and mar-proofness, the fine groove is formed as a concave portion shaped like an approximate triangle in section and depressed from the upper surface as shown in FIGS. 2 and 3.

From the point of view of reducing the influence of the light output means on the light transmitted vertically through the light pipe as small as possible to thereby reduce the influence of the light output means on display light of the liquid-crystal display panel when the light pipe is used as a front light unit for a touch panel-including illuminator, it is preferable that the area occupied by the light output means constituted by the fine grooves is selected to be not larger than ⅛ as large as the area of the upper surface of the light pipe. In the case where a display image of the liquid-crystal display device is observed through the light pipe applied to the touch panel-including illuminator, when the area occupied by the light output means is too large compared with the area of the upper surface, the quantity of light reflected by the slopes of the light output means increases so that display light can hardly emerge toward the observer. When the area of the light output means is selected to be not larger than ⅛ as large as the area of the upper surface, a large part of the upper surface can be formed as a portion in which the light output means are not formed. In this case, display light of the liquid-crystal display device can be transmitted through this portion efficiently to avoid the problem.

When the ratio of the light output means to the upper surface of the light pipe is reduced in cooperation with the situation that the light output means are constituted by the small-sized fine grooves, the adhesive layer hardly enters the fine grooves on the occasion where the light pipe is bonded to the touch panel through the adhesive layer. Accordingly, small ratio of the light output means is advantageous from the point of view of improving light output efficiency from the lower surface of the light pipe. The preferred area occupied by the light output means is not larger than ¹⁄₁₀, especially not larger than ¹⁄₁₅ as large as the area of the upper surface of the light pipe.

It is preferable that the upper and lower surfaces of the light pipe are flat surfaces as smooth as possible except the portion of the fine grooves constituting the light output means as described above and that the upper and lower surfaces are especially flat surfaces with an angle change range of ±2 degrees, further especially flat surfaces with 0 degrees. It is also preferable that the angle change is within 1 degree per 5 mm length. When the upper and lower surfaces are provided as such flat surfaces, large part of the upper and lower surfaces of the light pipe can be provided as smooth surfaces with the angler change range of 2 degrees. Hence, a large part of display light of the liquid-crystal display panel can be transmitted through the flat portions. Moreover, when the display light is transmitted through the flat portions, display light is little affected so that the display light can be prevented from being mixed with light transmitted through the fine grooves and subjected to refraction and reflection. Accordingly, liquid-crystal display good in display quality can be achieved.

The light pipe may be formed from one kind of a suitable material or two or more kinds of suitable materials in accordance with the wavelength range of the light source and exhibiting transparency to the wavelength range. Incidentally, examples of the suitable materials used in a visible light range include: transparent resins such as an acrylic resin, a polycarbonate resin, an epoxy resin, a polyester resin, and a norbornene resin; and glass. A light pipe formed from a material exhibiting no birefringence or little birefringence is preferably used. From the point of view of reduction in weight, a light pipe small in specific gravity is preferably used.

The light pipe may be formed by a suitable method. The method for forming the light pipe is not particularly limited. Examples of the producing method include: a method in which a thermoplastic resin is hot-pressed against a mold capable of forming a predetermined shape to thereby transfer the shape to the thermoplastic resin; a method in which a mold capable of forming a predetermined shape is filled with a hot-melted thermoplastic resin or with a resin fluidized by heat or through a solvent; a method in which a polymerizing process is performed after a mold capable of forming a predetermined shape is filled with a liquid resin polymerizable by heat or by radiation rays such as ultraviolet rays, or after the liquid resin is cast in the mold; a method in which a coating layer is obtained by application of the liquid resin onto a mold capable of forming a predetermined shape, and the coating layer of the liquid resin is brought into close contact with a transparent base material such as a resin plate and subjected to a polymerizing process; a method in which a coating layer is obtained by application of the liquid resin onto a soft and transparent base material such as a film, the coating layer is brought into close contact with a mold capable of forming a predetermined shape and subjected to a polymerizing process, and then the polymerized coating layer is brought into close contact with a transparent base material such as a resin plate through an adhesive agent.

Hence, the light pipe maybe formed as a laminate of parts made from one kind of a material or from different kinds of materials, such as a laminate obtained by bonding a sheet with light output means onto a light guide portion taking charge of light transmission. That is, the light pipe need not be formed as an integral single layer body made from one kind of a material. The thickness of the light pipe can be determined suitably in accordance with the size of the light pipe and the size of the light source disposed on the incidence side surface based on the purpose of use. The thickness of the light pipe generally used for forming a reflective liquid-crystal display device is not larger than 20 mm, especially in a range of from 0.1 to 10 mm, further especially in a range of from 0.5 to 5 mm, on the basis of the thickness of the incident side surface of the light pipe. The light pipe may contain an anti-reflection layer in its lower surface or may contain a hard coat layer in its upper surface.

As shown in FIG. 1, at least one light source 2 is disposed on the incidence side surface 1c of the light pipe, so that an illuminator is formed. A suitable material can be used as the light source. Generally, a linear light source such as a (cold or hot) cathode tube, a point light source such as a light-emitting diode, an array of point light sources arranged linearly or planarly, or a light source using a device such as a linear light pipe for converting light emitted from a point light source into a state of linear light emission at regular or random intervals may be used as the light source.

When the illuminator is formed, the light source may be used in combination with a suitable assisting unit such as a reflector which is provided for enclosing the light source to efficiently lead divergent light from the light source to the incidence side surface of the light pipe as occasion demands. A resin sheet provided with a high-reflectance metal thin film or a sheet of metal foil may be used as the reflector. When the reflector is bonded to end portions of the light pipe through an adhesive agent in order to retain the light source, the light output means formed in the adhesive portion may be omitted.

A transparent touch panel having a mechanism of detecting an input position is bonded to the outer side of the upper surface 1a of the light pipe 1 where the light output means are formed as shown in FIG. 1, through the transparent adhesive layer 3 to thereby form a touch panel-including illuminator. A suitable material having a mechanism of detecting an input position and capable of transmitting light vertically can be used as the touch panel. Hence, any one of known transparent touch panels can be used. Generally, the following touch panel can be used. That is, two sheets of transparent base materials provided with transparent electrodes respectively are arranged through a gap while the electrode sides face each other. Further, input position detecting electrodes for electrically reading an electrode contact position are provided so that the input position can be detected. In this manner, a touch panel is formed. Incidentally, a transparent base material having flexibility and exhibiting pressure-deformability is used at least as the input side transparent base material which is one of the transparent base materials.

FIG. 1 shows an example of the touch panel. The touch panel 4 includes: an input side transparent base material 43 provided with a transparent electrode 44; a pressure-receiving side transparent base material 41 provided with a transparent electrode 42; and a spacer 45 through which the two transparent base materials 43 and 41 are arranged with a gap so that the transparent electrode sides face each other. Though not shown in FIG. 1, resistance value detecting electrodes and lead wires for leading the resistance value detecting electrodes out are provided in the transparent electrodes 42 and 44 respectively.

The touch panel which can be preferably used is a touch panel in which surfaces of the transparent electrodes facing each other are made flat and excellent in smoothness. If the surfaces of the transparent electrodes are roughened, stress is apt to be always applied on a predetermined place at touch inputting so that the transparent electrodes may be cracked or peeled to cause breaking of wires. Particularly when a surface of the pressure-receiving side transparent electrode is provided with prism-like concavo-convex portions for constituting the light output means, stress is apt to be concentrated on the apices of the prism-like concavo-convex portions. In the light pipe according to the invention, concavo-convex portions constituted by fine grooves can be substantially prevented from having an influence on the surfaces of the transparent electrodes in the touch panel. Accordingly, when the surfaces of the transparent electrodes in the touch panel are made flat, stress can be prevented from being concentrated on one place at touch inputting. As a result, damage of the electrodes can be lightened so that the lifetime of the touch panel can be elongated.

The touch panel preferably used from the point of view of facilitating pressure deformation owing to flexibility is a touch panel in which the input side base material is made of a transparent film and a transparent electrode formed on the transparent film. It is further preferable that the pressure-receiving side base material in the touch panel is made of a support base material which has an in-plane retardation of not larger than 20 nm, especially not larger than 10 nm, and a transparent electrode formed on the support base material. This is provided for suppressing coloring of emergent light.

That is, when light transmitted through the light pipe is reflected in another manner than total reflection, the reflectance may vary in accordance with the direction of vibration of light so that the light may emerge as polarized light from the light pipe. In addition, polarized light may be generated by partial reflection in the interface of the adhesive layer through which the light pipe and the touch panel are bonded to each other. If such polarized light is made incident on the pressure-receiving side base material in the touch panel so that the polarized light is affected by the retardation, emergent light may be colored because of color of chromatic polarization. Therefore, arrangement of the pressure-receiving side base material in the touch panel is provided for reducing the in-plane retardation to thereby suppress such coloring as effectively as possible. Incidentally, the in-plane retardation can be obtained by a product of the refractive index difference between the direction of the slow axis and the direction of the fast axis in a plane of the base material and the thickness of the base material.

From the point of view of preventing emergent light from being colored in the manner as described above, it is also preferable that the thicknesswise retardation of the support base material in the pressure-receiving side base material as one of constituent members of the touch panel is not larger than 50 nm, especially not larger than 30 nm, further especially not larger than 20 nm. The thicknesswise retardation can be obtained as a value obtained by multiplying the difference between the average in-plane refractive index and the thicknesswise refractive index of the base material by the thickness of the base material.

Incidentally, for use in a touch panel, there is known a transparent base material including a transparent film of PET (polyethylene terephthalate), and a thin film of ITO (indium-tin oxide) formed as a transparent electrode on the transparent film by a vacuum vapor deposition method. In this case, the PET film as a base material may have a very large retardation ranging from a thousand and several hundred nm to several thousand nm. A base material with a small retardation may be formed by a suitable method such as a casting method or may be formed by a method of eliminating optical distortion in an annealing process.

A suitable material as listed above in the description for the light pipe may be used for forming each the transparent base materials in the touch panel. The touch panel may contain an anti-reflection layer in its outermost surface, especially in its visual side outermost surface. The provision of the anti-reflection layer can suppress lowering of contrast of display light owing to mirroring of external light. Incidentally, from the point of view of preventing the coloring of the emergent light, it is preferable that the retardation in the light pipe is as small as possible. It is preferable that the light pipe has an in-plane retardation of not larger than 20 nm, especially not larger than 10 nm and a thicknesswise retardation of not larger than 50 nm, especially not larger than 30 nm, further especially not larger than 20 nm.

A suitable light-transmissive layer can be used as the adhesive layer for bonding the light pipe and the touch panel to each other. The adhesive layer is not particularly limited. From the point of view of facilitating the bonding process, a tacky layer is preferably used. As a tackifier for forming the tacky layer, it is possible to use a suitable one such as a rubber tackifier or an acrylic tackifier without any particular limitation.

Figure 9:
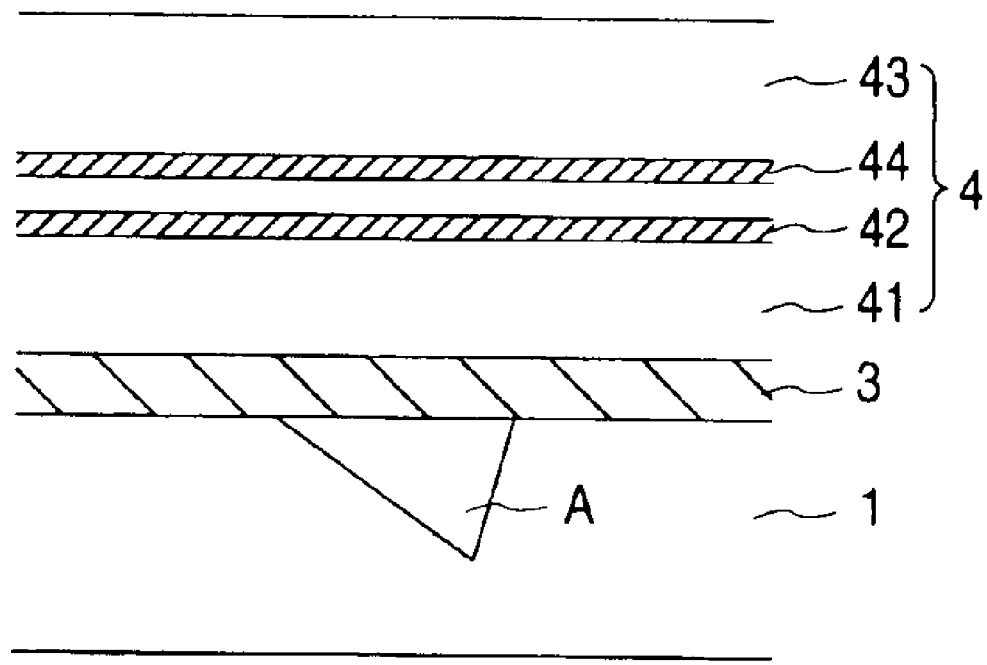
FIG. 9 is an enlarged side view of a touch panel-including illuminator.

In the condition that the light pipe and the touch panel are bonded to each other through the adhesive layer, it is preferable that the inside of the fine grooves A constituting the light output means in the upper surface $1a$ of the light pipe 1 is not filled with the adhesive layer as shown in FIG. 1. That is, as enlarged and shown in FIG. 9, it is preferable that the light pipe 1 is bonded to the pressure-receiving side base material 41 of the touch panel 4 through only flat portions other than the fine grooves in the upper surface of the light pipe 1 and that the adhesive layer 3 does not enter the inside of the fine grooves A constituting the light output means so that the inside of each of the fine grooves A is filled with air so as to serve as a space as large as possible. This arrangement is provided for achieving good light output characteristic while keeping the function of the light output means constituted by the fine grooves as effectively as possible.

If the inside of each of the fine grooves is filled with the adhesive layer, the incident angle range allowing total reflection by the fine grooves is narrowed so that the light incidence efficiency is lowered. For this reason, the capability of changing the optical path of light transmitted through the light pipe toward the direction of the liquid-crystal display panel is lowered so that illuminating efficiency is apt to be lowered. When, for example, the light pipe is provided with light output means having a structure in which prism-like concavo-convex portions each formed with an apical angle of about 135 degrees are disposed adjacently so as to be shaped like stripes, the adhesive layer is apt to enter the light output means on the occasion where the light pipe is bonded to the touch panel through the adhesive layer because the apical angle of each prism is wide.

If the adhesive layer enters the light output means, total reflection little occurs because the refractive index difference between the adhesive layer and the light pipe is considerably small compared with the refractive index difference between air and the light pipe. Total reflection is particularly effective in changing the direction of light at a large angle to thereby make the light travel toward the liquid-crystal display panel. If total reflection hardly occurs, the light output efficiency is lowered greatly to make bright display difficult. In the method of providing the light output means constituted by the fine grooves in the light pipe according to the invention, penetration of the adhesive layer into the fine grooves can be avoided easily. On the contrary, in the method of providing the light output means constituted by diffusing surfaces as described in Unexamined Japanese Patent Publication No. 2000-162594, it is almost impossible to perform the bonding process through the adhesive layer to left the air layer.

The preferred adhesive layer from the point of view of preventing penetration of the adhesive layer into the fine grooves is an adhesive layer having a large elastic modulus. Especially, the preferred one is an adhesive layer having a storage elastic modulus of not smaller than $5 \times 10^4$ N/m$^2$, especially not smaller than $10^5$ N/m$^2$, further especially not smaller than $10^6$ N/m$^2$ at 20° C. As a result, the adhesive layer can be prevented from entering the fine grooves owing to deformation by pressing force at the time of bonding. In consideration of deformation for a long time, an adhesive layer having a large loss elastic modulus is preferably used. In addition, the thickness of the adhesive layer is advantageously selected to be not larger than 25 $\mu$m, especially in a range of from 1 to 20 $\mu$m, further especially in a range of from 5 to 15 $\mu$m in order to keep balance between prevention of penetration of the adhesive layer into the fine grooves and adhesive force. If the adhesive interface is peeled because of shortage of adhesive force, interfacial reflection increases so that reflectance of external light increases greatly. It is therefore preferable that the bonding process is performed evenly and steadily.

Incidentally, in the case of a tacky layer, the tacky layer may enter the fine grooves easily because the elastic modulus is reduced at a high temperature due to heating. In this case, the tacky layer can be cured, for example, by a method of irradiation with ultraviolet rays or electron beams in order to improve the elastic modulus to thereby attain stability of the elastic modulus. Accordingly, a tacky layer in which the elastic modulus is hardly reduced by heating and in which the elastic modulus is sufficient large even at a high temperature may be preferably used as the tacky layer.

It is preferable that the adhesive layer has a refractive index lower than that of the light pipe and that the refractive index difference between the adhesive layer and the light pipe is not smaller than 0.02, especially in a range of from 0.03 to 0.5. As a result, light transmitted through the light pipe so as to be incident at a high angle on the upper surface because of high parallelism of the adhesive layer to the upper surface can be totally reflected efficiently so that light leaked from the light pipe to the touch panel through the adhesive layer can be reduced as much as possible to thereby reduce the optical influence of the touch panel. Particularly light contributing to illumination for the liquid-crystal display panel is light transmitted through the light pipe in parallel to the upper and lower surfaces or at an angle near to the parallel. The intensity of the light transmitted at such a high angle is large. Accordingly, when such light is prevented from entering the touch panel, the influence of the light on illumination light can be reduced to suppress lowering of contrast to thereby achieve display easy to view.

From the point of view of the refractive index difference, an acrylic tacky layer is preferably used. In this case, if the tacky layer is crosslinkable by radiant rays, a crosslinking process may be performed after bonding to enhance the elastic modulus to thereby improve thermal stability. Incidentally, the bonding process in which the adhesive layer does not enter the fine grooves can be performed by a suitable method such as a method of providing an adhesive layer on the touch panel to bond the touch panel and the light pipe to each other through the adhesive layer, and a method of transferring a tacky layer provided on a separator onto the touch panel or onto the light pipe to bond the touch panel and the light pipe to each other through the tacky layer.

In the touch panel-including illuminator according to the invention, light incident on the incidence side surface can be collimated accurately as parallel light. The parallel light can be made to emerge from the lower surface in a direction excellent in perpendicularity favorable to viewing. Light from the light source can be utilized efficiently, so that there can be formed various devices such as a touch-input type reflective liquid-crystal display device bright, easy to view and excellent in low electric power consumption.

The reflective liquid-crystal display device can be formed as a front light type liquid-crystal display device in which a reflective liquid-crystal display panel 70 having a reflecting layer is disposed on the lower surface 1b side of the light pipe 1 in the touch panel-including illuminator 10 as shown in FIG. 1. Although FIG. 1 shows the case where a reflecting layer 60 is provided outside the back-side substrate 51 in the liquid-crystal cell 50, the invention may be applied also to the case where a reflecting layer serving also as an electrode (22) in the inside of the back-side substrate 50 is provided in the liquid-crystal cell.

Generally, the reflective liquid-crystal display device is formed by use of a liquid-crystal display panel and a front light unit by assembling a liquid-crystal cell having an electrode functioning as a liquid-crystal shutter, a driver attached to the liquid-crystal cell and a reflecting layer and by assembling constituent parts such as a polarizer and a compensatory phase retarder suitably as occasion demands. In the invention, the reflective liquid-crystal display device can be formed in accordance with the related art without any specific limitation except that the touch panel-including illuminator is used as a front light unit.

Incidentally, the liquid-crystal cell 50 in FIG. 1 includes: a back-side transparent substrate 51 having a transparent electrode 52 and a rubbing film 53 provided successively on the inner side of the back-side transparent substrate 51; a visual-side transparent substrate 59 having a color filter 58, a transparent electrode 57 and a rubbing film 56 provided successively on the inner side of the visual-side transparent substrate 59; liquid crystal 54 injected between the back-side transparent substrate 51 and the visual-side transparent substrate 59; and a sealing material 55 with which the liquid crystal 54 is sealed. A polarizer 64 is provided on the outer side of the visual-side transparent substrate 59 through a phase retarder 63. A polarizer 61 is provided on the outer side of the back-side transparent substrate 51 through a phase retarder 62. A reflecting layer 60 is disposed on the outer side of the polarizer 61. Thus, a reflective liquid-crystal display panel 70 is formed.

The liquid-crystal cell used for forming the liquid-crystal display panel is not particularly limited. For example, on the basis of the format of alignment of liquid crystal, there can be used a suitable liquid-crystal cell such as a twisted or non-twisted liquid-crystal cell such as a TN liquid-crystal cell, an STN liquid-crystal cell, a vertically aligned cell, an HAN cell or an OCB cell; a guest-host liquid-crystal cell; or a ferroelectric liquid-crystal cell. Further, the method for driving liquid crystal is not particularly limited. For example, a suitable drive method such as an active matrix method or a passive matrix method may be used.

The arrangement of the reflecting layer is essential to the reflective liquid-crystal display panel The position of arrangement of the reflecting layer is optional. For example, the reflecting layer may be provided on the outer side of the liquid-crystal cell 50 as described above and shown in FIG. 1 or may be provided on the inner side of the liquid-crystal cell. The reflecting layer can be formed as a suitable reflecting layer according to the related art. Examples of the reflecting layer are: a coating layer containing powder of a high-reflectance metal such as aluminum, silver, gold, copper or chromium in a binder resin; a layer of a metal thin film deposited by a vapor deposition method; a reflecting sheet having the coating or deposited layer supported by a base material; and a sheet of metal foil. Incidentally, when the reflecting layer is provided on the inner side of the liquid-crystal cell, a transparent electrically conductive film made of a related-art transparent electrode-forming material may serve also as the reflecting layer.

On the other hand, a suitable material can be used as the polarizer as occasion demands. A material high in the degree of polarization such as an absorptive type linear polarizing element of iodine or dye can be used preferably from the point of view of obtaining good-contrast-ratio display through incidence of high-grade linearly polarized light. The phase retarder is provided for compensating for birefringence of liquid crystal to attain improvement of visibility. The phase retarder(s) can be disposed between the visual-side polarizer and the liquid-crystal cell or/and between the back-side polarizer and the liquid-crystal cell as shown in FIG. 1 in accordance with necessity. A suitable material in accordance with the wavelength range can be used as the phase retarder. The phase retarder may be formed as a single layer or as a multilayer of two or more retardation layers.

In the reflective liquid-crystal display device shown in FIG. 1, viewing is performed as follows. In an illumination mode in which the light source 2 of the touch panel-including illuminator 10 is turned on, light emerging from the lower surface 1b of the light pipe 1 passes through the polarizer 64, the liquid-crystal cell 50, etc. and is reflected by the reflecting layer 60. The reflected light passes through the liquid-crystal cell, the polarizer, etc. in the reverse traveling course and reaches the light pipe 1. As a result, a display image transmitted through other portions than the fine grooves A is viewed through the touch panel 4.

Incidentally, when the touch panel-including illuminator can take in external light, a display image can be viewed also in an external light mode in which the light source 2 is turned off. In the external light mode, light incident on other portions than the fine grooves A in the upper surface 1a of the light pipe 1 via the touch panel 4 is transmitted, travels in the reverse course as described above and reaches the light pipe 1. As a result, a display image transmitted through other portions than the fine grooves A is viewed through the touch panel 4. Incidentally, in the case for an illumination-external light double type liquid-crystal display device, the reflective liquid-crystal display device is formed so that the light source can be changed over between turning on and turning off.

For the formation of the reflective liquid-crystal display device, alight-diffusing layer may be disposed between the touch panel-including illuminator and the liquid-crystal display panel as occasion demands in order to prevent unevenness in light and shade to thereby attain uniformity of brightness. Hence, the light-diffusing layer may be provided on the light emergence surface of the touch panel-including illuminator, that is, on the lower surface of the light pipe so as to be integrated with the touch panel-including illuminator in advance. The light-diffusing layer can be formed by a suitable method without any particular limitation. Examples of the suitable method include: a method of applying and curing a transparent resin containing transparent particles dispersed therein; a method of applying and curing a transparent resin containing air bubbles dispersed therein; a method of swelling a surface of a layer through a solvent to thereby generate a craze; a method of forming a transparent resin layer having a random concavo-convex surface; and a method using a diffusing sheet formed in accordance with the above description.

Optical elements or components such as a touch panel-including illuminator, a liquid-crystal cell, a polarizer, etc. for forming the liquid-crystal display device according to the invention may be wholly or partially integrally laminated/fixed onto one another or maybe disposed separably. From the point of view of prevention of lowering of contrast based on suppression of surface reflection, it is preferable that such optical elements or components are fixed onto one another. A suitable transparent adhesive agent such as a tackifier can be used for the fixing/bonding process. A layer of the transparent adhesive agent may be made to contain transparent particles so that the layer is provided as an adhesive layer exhibiting a diffusing function.

REFERENCE EXAMPLE 1

A chromium mask was formed as follows. Openings each 100 μm long and 10 μm wide were formed in a 35 mm×25 mm rectangular region of a glass substrate so that the direction of short sides of the rectangular region was parallel with the direction of the length of each of the openings. Incidentally, the openings were disposed so at random that the density of the openings increased gradually from one short side of the rectangular region to the other short side thereof, that is, the density of the openings increased continuously in a direction of the long side of the rectangular region (FIG. 4). The area occupied by the openings in total was selected to be not larger than 1/10 as large as the area of the rectangular region.

On the other hand, polyimide varnish was applied onto a clean glass plate by spin coating. After pre-baked at 100° C. for 30 minutes, the polyimide varnish was sintered at 350° C. for 4 hours. Thus, a polyimide coating film 10 μm thick was formed on the clean glass plate. Then, a chromium film 0.1 μm thick and a copper film 0.5 μm thick were successively formed on the polyimide coating film by a sputtering method. A positive resist 5 μm thick was applied onto a surface of the copper film by spin coating. In this manner, a sample plate was produced.

The chromium mask was disposed closely on the positive resist of the sample plate. After exposure by ultraviolet rays, the resist was developed. Further, the copper film and the chromium film were removed by etching. Thus, a sample plate having the polyimide coating film exposed at its opening portions was obtained. The sample plate was irradiated with a laser beam while a parallel excimer laser was scanned by a large number of times in the condition that the short side of the sample plate was set to be sparse in the density of the openings and to be perpendicular to the direction of the movement of the laser beam whereas the long side of the sample plate was inclined at 43 degrees to the laser beam. In this manner, the polyimide coating film in the respective opening portions was partially removed by ablation. Then, the copper film and the chromium film in the sample plate were removed by etching. Then, a silver thin film was applied on the sample plate by vacuum vapor deposition. The sample plate was nickeltyped and cut into a predetermined shape. Thus, a mold A was obtained.

REFERENCE EXAMPLE 2

A mold B was obtained in the same manner as in Reference Example 1 except that the sample plate was replaced by a sample plate (FIG. 5) having openings disposed in a rectangular region at random so that the density of arrangement of the openings increased continuously in a direction of each long side of the rectangular region and so that the density in portions nearer to each long side became higher than the density in the center portion of the rectangular region.

REFERENCE EXAMPLE 3

A surface of a rectangular brass plate was cut at a position far by 2.5 mm from the incidence side surface by a diamond tool. Thus, there was obtained a mold C having striped light output means disposed at intervals of 210 μm and each shaped like a scalene triangle in section. The direction of cutting was selected to be parallel to the direction of the length of the brass plate. Each of the light output means had an optical path changing slope 20 μm wide and inclined at an angle of 42 degrees, and a gentle slope 190 μm wide. The optical path changing slopes faced the incidence side surface. The area occupied by the optical path changing slopes was selected to be $1/10.5$ as large as the area of the upper surface.

REFERENCE EXAMPLE 4

A surface of a rectangular brass plate was sandblasted to thereby obtain a mold D having a delustered surface as a surface for forming the light output means.

REFERENCE EXAMPLE 5

A mold E was obtained in the same manner as in Reference Example 1 except that the sample plate was irradiated with a laser beam while parallel excimer laser was scanned by a large number of times in the condition that the short side of the sample plate was set to be sparse in the density of the openings and to be perpendicular to the laser beam, so that the polyimide coating film was partially removed by ablation. That is, the mold E had no surface allowing the optical path changing slopes to be formed at a predetermined angle.

EXAMPLE 1

An ultraviolet-curable acrylic resin was applied onto the mold A obtained in Reference Example 1. An acrylic plate which was 1.2 mm thick, 40 mm wide and 30 mm long and which had end surfaces polished was quietly put on the acrylic resin. After the acrylic resin and the acrylic plate were made to adhere closely to each other by a rubber roller so that surplus resin and air bubbles were extruded, the acrylic resin was irradiated with ultraviolet rays by a metal halide lamp so as to be cured. Then, the cured acrylic resin was separated from the mold A. In this manner, the negative shape of the mold A was transferred onto the acrylic plate to thereby obtain a light pipe A having the cured layer. Incidentally, the refractive index of the acrylic plate was 1.495 and the refractive index of the cured layer was 1.512. According to the result of observation of a section by an SEM (scanning electron microscope), the light pipe obtained was provided with light output means constituted by fine grooves each made of a concave portion shaped like an approximate triangle in section, each of the fine grooves having an optical path changing slope inclined at an angle of about 42 degrees, and a steep slope inclined at an average angle of about 70 degrees. Other portions than the light output means in the light pipe were flat portions. Hence, the shape of each of the light output means was formed by transference of the negative shape of the mold A.

An ITO thin film was provided on a surface of a casting film of a norbornene resin (ARTON made by JSR Corp.) by a vacuum vapor deposition method to thereby form a transparent electrode. The sheet resistance of the thin film obtained was 400 Ω/☐. The film was cut into a size 40 mm wide and 20 mm long so that two film sheets were prepared. In each of the two film sheets, long sides and short sides were printed with silver paste to thereby form an electrode. Then, a transparent resin spacer was formed between the two film sheets. The peripheries of the two film sheets were bonded to each other by a double-coated tape while the electrodes were made to face each other through the spacer. Thus, a touch panel A was obtained. According to the measurement of the retardation between the two film sheets, the in-plane retardation was 12 nm and the thicknesswise retardation was 35 nm.

The touch panel A was bonded to the upper surface of the light pipe A obtained in the manner described above, through an acrylic tackifier having a refractive index of 1.468. A cold-cathode tube was disposed on the incidence side surface of the light pipe so that the optical path changing slopes of the fine grooves faced the cold-cathode tube. Thus, a touch panel-including illuminator was obtained. Incidentally, the storage elastic modulus of the acrylic tackifier was $1.8 \times 10^5$ N/m² at 20° C.

EXAMPLE 2

A light pipe B was obtained in the same manner as in Example 1 except that the mold B obtained in Reference Example 2 was used. A touch panel-including illuminator was obtained in the same manner as in Example 1 except that the light pipe A was replaced by the light pipe B. According to the result of observation of a section by an SEM, the light pipe B had light output means constituted by fine grooves each made of a concave portion shaped like an approximate triangle in section, the fine grooves being formed by transference of the negative shape of the mold B. Each of the concave portions had an optical path changing slope inclined at an angle of about 41 degrees, and a steep slope inclined at an average angle of about 72 degrees.

EXAMPLE 3

A light pipe C was obtained in the same manner as in Example 1 except that the mold C obtained in Reference Example 3 was used. A touch panel-including illuminator was obtained in the same manner as in Example 1 except that the light pipe A was replaced by the light pipe C. According to the result of observation of a section by an SEM, the light pipe C had light output means constituted by a repetitive structure of prism-like concavo-convex portions each made of a concave portion shaped like an approximate triangle in section, the repetitive structure being formed by transference of the negative shape of the mold C. There was no flat portion in the repetitive structure. Each of the concave portions had an optical path changing slope inclined at an angle of about 42 degrees, and a gentle slope inclined at an average angle of about 3 degrees.

EXAMPLE 4

A light pipe D was obtained in the same manner as in Example 1 except that the mold D obtained in Reference Example 4 was used. A touch panel-including illuminator was obtained in the same manner as in Example 1 except that the light pipe A was replaced by the light pipe D. According to the result of observation of a section by an SEM, the light pipe D had light output means constituted by random concavo-convex portions formed by transference of the negative shape of the mold D.

EXAMPLE 5

A light pipe E was obtained in the same manner as in Example 1 except that the mold E obtained in Reference Example 5 was used. A touch panel-including illuminator was obtained in the same manner as in Example 1 except that the light pipe A was replaced by the light pipe E. According to the result of observation of a section by an SEM, the light pipe E had light output means each constituted by a nearly rectangular trapezoid in section and formed by transference of the negative shape of the mold E. The angle between a slope and an opposite face in each of the light output means was about 80 degrees.

EXAMPLE 6

An acrylic plate 1.2 mm thick was cut into a size 40 mm wide and 30 mm long, and end surfaces of the acrylic plate were polished to thereby form a light pipe F. A touch panel-including illuminator was obtained in the same manner as in Example 1 except that the light pipe A was replaced by the light pipe F and the following touch panel B was used. Incidentally, the touch panel B was produced in the same manner as the touch panel A except that the following material was used as a pressure-receiving side base material. That is, light output means constituted by a repetitive structure of prism-like concavo-convex portions were formed on a norbornene resin film in the same manner as in Example 3 in which the light pipe C was formed by use of the mold C. Then, an ITO thin film was formed on the light output means of the film. Then, the film was cut into a size 40 mm wide and 30 mm long. The pressure-receiving side base material thus obtained was used.

EXAMPLE 7

A touch panel-including illuminator was obtained in the same manner as in Example 1 except that the light pipe A was replaced by the light pipe F and the following touch panel C was used. Incidentally, the touch panel C was produced in the same manner as the touch panel A except that the following material was used as a pressure-receiving side base material. That is, the mold D was used instead of the mold C so that a norbornene resin film having light output means constituted by random concavo-convex portions was formed. Then, an ITO thin film was formed on the light output means of the film; Then, the film was cut into a size 40 mm wide and 30 mm long. The pressure-receiving side base material thus obtained was used.

EXAMPLE 8

A touch panel using a PET film instead of the norbornene resin film was formed as the touch panel A. A touch panel-including illuminator was obtained in the same manner as in Example 1 except that the touch panel was used. Incidentally, the PET film had an in-plane retardation of 1,780 nm and a thicknesswise retardation of 3,400 nm.

EXAMPLE 9

A touch panel-including illuminator was obtained in the same manner as in Example 1 except that the light pipe A and the touch panel A were bonded to each other through an acrylic tackifier having a refractive index of 1.468 and a storage elastic modulus of $3 \times 10^4$ N/m² at 20° C.

EXAMPLE 10

A touch panel-including illuminator was obtained in the same manner as in Example 1 except that the light pipe A and the touch panel A were bonded to each other through an acrylic tackifier having a refractive index of 1.505 and a storage elastic modulus of $1.4 \times 10^5$ N/m² at 20° C.

EXAMPLE 11

A touch panel-including illuminator was obtained in the same manner as in Example 1 except that the light pipe A and the touch panel A were simply stacked on each other without interposition of any acrylic tackifier.

Evaluation Test

A normally white reflective liquid-crystal display panel a half of the liquid-crystal cell was in a white state and the other half was in a black state. In addition, luminance in the center of the white display portion was measured.

Results of the measurement were as shown in the following Table.

|  | Frontal Luminance (cd/m$^2$) |
| --- | --- |
| Example 1 | 32 |
| Example 2 | 34 |
| Example 3 | 15 |
| Example 4 | 2 |
| Example 5 | 7 |
| Example 6 | 27 |
| Example 7 | 7 |
| Example 8 | 29 |
| Example 9 | 25 |
| Example 10 | 31 |
| Example 11 | 40 |

It was apparent from Table that high luminance was achieved in each of Examples 1 and 2. As results of microscopic observation, an air layer was observed in each of the fine groove portions in each of Examples 1 and 2. It was also apparent that each of the fine grooves was not filled with any tacky layer in each of Examples 1 and 2. Moreover, the state of light emerging from the lower surface of the light pipe was observed. As a result, the light emerged intensively in a direction approximately perpendicular to the light pipe, so that high luminance was achieved. It was to be understood that the reflective liquid-crystal display panel could be illuminated effectively. In addition, the panel was excellent in blackness and high in contrast even in the black state.

On the other hand, luminance in Example 3 was about ½ as high as that in each of Examples 1 and 2. According to the microscopic observation of Example 3, it was found that a large number of grooves were filled with a tacky layer because the angle of each of the surfaces opposite to the light output means was shallow. Accordingly, it was conceived that the area of slopes allowing total reflection was reduced due to the penetration of the tacky layer to thereby make luminance low. Moreover, in Example 3, occurrence of moire between the light output means and pixels was observed, so that display was not easy to view.

It was found that light little emerged in Example 4. According to the result of microscopic observation, the concavo-convex portions of the light pipe in Example 4 were thoroughly filled with a tacky layer. Accordingly, contrast between the white state and the black state was low, so that it was difficult to distinguish the two states from each other.

According to the microscopic observation, the light output means in Example 5 were little filled with a tacky layer. In Example 5, however, light emerged obliquely at a high angle, so that frontal luminance was very low compared with that in each of Examples 1 and 2. This was because the angle of the slopes in Example 5 for reflecting light was high compared with that in each of Examples 1 and 2 so that light transmitted through the light pipe could not be totally reflected. According to the observation at the lower surface of the light pipe, it was found that light little emerged in a direction perpendicular to the lower surface. In addition, direct light leakage from the upper surface was observed, so that it was difficult to distinguish white and black from each other.

Luminance in Example 6 was about 80% as high as that in each of Examples 1 and 2. According to the observation at the lower surface of the light pipe, light emerged intensively obliquely at a high angle. It was conceived that transmitted light was not made incident on the touch panel effectively because the transmitted light was totally reflected by the tacky layer. In addition, occurrence of moire between the light output means and pixels was so intensive that display was not easy to view.

Luminance in Example 7 was not higher than ¼ of that in each of Examples 1 and 2. That is, display in Example 7 was dark. The angle of emergent light was high, so that the liquid-crystal display panel could not be illuminated effectively. In addition, light emerged directly from a surface of the touch panel. Accordingly, contrast was so low that display was not easy to view.

Luminance in Example 8 was approximately equivalent to that in each of Examples 1 and 2. In Example 8, however, display was not easy to view because rainbow unevenness was observed in the touch panel as the viewing angle was made to fall down.

Luminance in Example 9 was about 75% as high as that in each of Examples 1 and 2. According to the microscopic observation, it was found that the fine grooves were slightly filled with a tacky layer. It was conceived that the tacky layer entered the inside of the light output means because the elastic modulus of the tacky layer was small.

Luminance in Example 10 was approximately equivalent to that in each of Examples 1 and 2. In Example 10, however, light was leaked from the periphery of a finger when the touch panel was pressed by the finger.

Luminance obtained in Example 11 was higher by about 20% as high as that in each of Examples 1 and 2. In Example 11, however, display was whitish due to interfacial reflection even in the black display state. Accordingly, contrast was so low that display was not easy to view.

Then, contrast was evaluated in the condition that a white state and a black state were displayed half by half in a bright room in which the light source was turned off. As a result, display in each of Examples 1, 2, 4 and 5 was very good and easy to view. On the contrary, display in each of Examples 3 and 6 was not easy to view because of occurrence of moire. In Example 7, display was not easy to view because black display was made whitish by scattering of light on a surface of the electrode in the lower surface of the touch panel. In Example 11, display was very difficult to view because surface reflection was so intensive that sufficient contrast could not be obtained.

On the other hand, a touch test was performed on one place by use of a weight (50 g) having a semispherical forward end with a diameter of 5 mm. As a result, current conduction was obtained even in a test of 20,000 times in each of Example 1 and 2 whereas current conduction was not obtained in a test of 3,500 times in Example 6 or in a test of 11,000 times in Example 7 because of breaking of the wires.

It is obvious from the results that Examples 1 and 2 are particularly excellent in brightness at the time of turning on the light source, contrast of display, easiness to view and the lifetime of the touch panel. It is also obvious that a touch panel-including illuminator can be achieved so that the illuminator can be used for forming a reflective liquid-crystal display device free from moire, bright and easy to view.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A touch panel-including illuminator comprising:
    a light pipe made of a transparent plate-like material having an upper surface, a lower surface and at least one incidence side surface, said upper surface being provided with light output means through which light incident on said incidence side surface is made to emerge from said lower surface;
    a light source disposed on said incidence side surface of said light pipe;
    a transparent adhesive layer; and
    a transparent touch panel including an input position detecting mechanism and bonded to an outer side of said upper surface of said light pipe through said transparent adhesive layer;
    wherein said light output means are constituted by fine grooves which are disposed discontinuously, each of which is made of a concave portion having a length of not larger than 250 µm and a depth of not larger than 50 µm and not larger than ⅕ as large as the length, and each of which is shaped like an approximate triangle in section;
    wherein each of said fine grooves has an optical path changing slope inclined at an angle ranging from 35 to 48 degrees to said lower surface of said light pipe, and a steep slope inclined at an angle of not lower than 60 degrees to said lower surface of said light pipe so as to face said optical path changing slope; and
    wherein said fine grooves are disposed so that said optical path changing slopes face said light source so as to be able to receive light incident on said incidence side surface of said light pipe from said light source.

2. A touch panel-including illuminator according to claim 1, wherein an area occupied by said light output means is not larger than ⅛ as large as an area of said upper surface of said light pipe.

3. A touch panel-including illuminator according to claim 1, wherein said light pipe is formed so that the inclination angle of each of said optical path changing slopes to said lower surface of said light pipe is in a range of from 38 to 45 degrees.

4. A touch panel-including illuminator according to claim 1, wherein said light pipe is formed so that said fine grooves constituting said light output means are disposed discontinuously and at random.

5. A touch panel-including illuminator according to claim 1, wherein said light pipe is formed so that said fine grooves constituting said light output means are disposed more densely as said fine grooves become farther from said light source.

6. A touch panel-including illuminator according to claim 1, wherein said light pipe is formed so that said fine grooves constituting said light output means are disposed more densely as said fine grooves become nearer to each of opposite side end surfaces on the basis of said incidence side surface of said light pipe.

7. A touch panel-including illuminator according to claim 1, wherein: said light source disposed on said incidence side surface of said light pipe is a linear light source; and said fine grooves constituting said light output means are disposed in parallel to said linear light source in terms of said optical path changing slopes of said fine grooves.

8. A touch panel-including illuminator according to claim 1, wherein: said light source disposed on said incidence side surface of said light pipe is a point light source; and said fine grooves constituting said light output means are disposed concentrically with said point light source as its virtual center.

9. A touch panel-including illuminator according to claim 1, wherein said touch panel includes an input side transparent base material provided with a transparent electrode, and a pressure-receiving side transparent base material provided with a transparent electrode, said two transparent base materials being disposed through a gap so that said respective transparent electrodes of said two transparent base materials face each other.

10. A touch panel-including illuminator according to claim 9, wherein said input side base material which is one of members constituting said touch panel is made of a transparent film and a transparent electrode formed on the transparent film.

11. A touch panel-including illuminator according to claim 9, wherein said pressure-receiving side base material which is one of members constituting said touch panel is made of a support base material with an in-plane retardation of not larger than 20 nm and a transparent electrode formed on said support base material.

12. A touch panel-including illuminator according to claim 9, wherein said pressure-receiving side base material which is one of members constituting said touch panel is made of a support base material with a thicknesswise retardation of not larger than 50 nm and a transparent electrode formed on said support base material.

13. A touch panel-including illuminator according to claim 9, wherein said touch panel further includes an anti-reflection layer as its outermost surface.

14. A touch panel-including illuminator according to claim 1, wherein said adhesive layer through which said light pipe and said touch panel are bonded to each other is a tacky layer.

15. A touch panel-including illuminator according to claim 1, wherein said fine grooves constituting said light output means in said upper surface of said light pipe are not filled with said adhesive layer through which said light pipe and said touch panel are bonded to each other.

16. A touch panel-including illuminator according to claim 1, wherein said adhesive layer through which said light pipe and said touch panel are bonded to each other has a lower refractive index than that of said light pipe by a refractive index difference of not smaller than 0.02.

17. A touch panel-including illuminator according to claim 1, wherein said adhesive layer through which said light pipe and said touch panel are bonded to each other has a storage elastic modulus of not smaller than $5 \times 10^4$ N/m$^2$ at 20° C.

18. A reflective liquid-crystal display device comprising a touch panel-including illuminator according to claim 1, and a reflective liquid-crystal display panel disposed on a lower surface side of a light pipe in said touch panel-including illuminator.

* * * * *